(12) United States Patent
Bellardi et al.

(10) Patent No.: US 11,060,479 B2
(45) Date of Patent: Jul. 13, 2021

(54) RECIPROCATING ENGINE

(71) Applicant: General Electric Company, Schenectady, NY (US)

(72) Inventors: Jason Joseph Bellardi, Cincinnati, OH (US); Andrew Jean Desrosiers, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/689,440

(22) Filed: Aug. 29, 2017

(65) Prior Publication Data
US 2019/0063364 A1 Feb. 28, 2019

(51) Int. Cl.
*F01P 1/04* (2006.01)
*F02F 3/22* (2006.01)
*F16C 3/16* (2006.01)
*F16C 7/02* (2006.01)

(52) U.S. Cl.
CPC .................. *F02F 3/22* (2013.01); *F16C 3/16* (2013.01); *F16C 7/023* (2013.01)

(58) Field of Classification Search
CPC ................ F02F 3/22; F16C 3/16; F16C 7/023
USPC ...................................................... 123/41.35
See application file for complete search history.

(56) References Cited

U.S. PATENT DOCUMENTS

| 1,910,902 | A | * | 5/1933 | McKone | F01M 1/06 184/18 |
| 2,031,242 | A | * | 2/1936 | Winslow | F02B 19/14 123/195 E |
| 2,369,906 | A | * | 2/1945 | Moore | F02F 3/22 123/41.38 |
| 2,369,907 | A | * | 2/1945 | Moore | F02F 3/22 123/41.38 |
| 2,407,429 | A | * | 9/1946 | Kuttner | F02F 3/003 92/186 |
| 3,069,926 | A | * | 12/1962 | Hoffman | F16C 9/04 184/6.5 |
| 3,204,617 | A | * | 9/1965 | Hulbert | F01M 1/06 123/41.38 |
| 4,142,484 | A | * | 3/1979 | Buhl | F01M 1/06 123/193.6 |
| 4,721,073 | A | * | 1/1988 | Naruoka | F02B 75/045 123/48 B |

(Continued)

OTHER PUBLICATIONS

Meyer, Steel Pistons for more efficient diesel engines, Project No. 03ET1079A, Bine, www.bine.info/fileadmin/content/Presse/_..14.../ProjektInfo_1416_internetx_engl.pdf, pp. 1-4.

*Primary Examiner* — Hung Q Nguyen
*Assistant Examiner* — Anthony Donald Taylor, Jr.
(74) *Attorney, Agent, or Firm* — Dority & Manning, P.A.

(57) ABSTRACT

A reciprocating engine includes a crankshaft and a connecting rod rotatably coupled to the crankshaft. The connecting rod defines a fluid passage extending along a length thereof. The reciprocating engine also includes a piston dome coupled to the connecting rod, the piston dome defining an inlet in fluid communication with the fluid passage of the connecting rod for receiving a fluid from the fluid passage of the connecting rod, a cooling passage in fluid communication with the inlet for circulating the fluid through the piston dome, and an exit in fluid communication with the cooling passage.

15 Claims, 4 Drawing Sheets

(56) References Cited

U.S. PATENT DOCUMENTS

| | | | | |
|---|---|---|---|---|
| 5,146,879 | A * | 9/1992 | Kume | F01M 1/06 |
| | | | | 123/48 B |
| 5,730,097 | A * | 3/1998 | Aoyama | F16C 3/14 |
| | | | | 123/196 R |
| 6,032,619 | A * | 3/2000 | Zhu | F02F 3/003 |
| | | | | 123/41.35 |
| 6,966,279 | B2 * | 11/2005 | Sidor | F01M 1/16 |
| | | | | 123/41.38 |
| 7,954,600 | B2 * | 6/2011 | Ohta | F01M 1/06 |
| | | | | 123/196 R |
| 9,625,156 | B2 | 4/2017 | Rudrapatna et al. | |
| 2006/0065215 | A1 * | 3/2006 | Wachigai | F01P 5/10 |
| | | | | 123/41.1 |
| 2011/0247590 | A1 | 10/2011 | Donovan | |
| 2012/0228397 | A1 | 9/2012 | Thomson | |
| 2014/0299091 | A1 | 10/2014 | Ribeiro et al. | |
| 2014/0367494 | A1 | 12/2014 | Donovan | |
| 2015/0322889 | A1 * | 11/2015 | Ni | F01M 1/06 |
| | | | | 123/197.4 |
| 2016/0003156 | A1 | 1/2016 | Hanson | |
| 2016/0003380 | A1 | 1/2016 | Ott et al. | |
| 2016/0186620 | A1 | 6/2016 | Knudsen | |
| 2016/0305363 | A1 * | 10/2016 | Leone | F02F 1/18 |
| 2016/0376996 | A1 | 12/2016 | Mironets et al. | |
| 2017/0284455 | A1 * | 10/2017 | Kim | F16C 7/06 |

* cited by examiner

RECIPROCATING ENGINE

FIELD

The present disclosure generally relates to a reciprocating engine, and more particularly to a reciprocating engine with built-in cooling features for a piston dome.

BACKGROUND

Reciprocating engines generally include a crankshaft coupled to a plurality of piston domes through a respective plurality of connecting rods. Each of the piston domes are slidably positioned within respective cylinders. Combustion within the respective cylinders causes the piston domes to move along a longitudinal direction of the respective cylinders, driving the connecting rods to rotate the crankshaft. Lubrication oil is routed to each of the cylinders and may be sprayed, e.g., onto a cold side of each of the piston domes. The lubrication oil provides lubrication for the piston domes sliding along the longitudinal direction of the respective cylinders.

However, with such a configuration the lubrication oil does not provide significant cooling of the piston dome. The inventors of the present disclosure have discovered that it may be beneficial to configure a reciprocating engine such that the lubrication oil, or other lubricating fluid, provides increased cooling of the piston domes during operation. Accordingly, such a configuration would be useful.

BRIEF DESCRIPTION

Aspects and advantages of the invention will be set forth in part in the following description, or may be obvious from the description, or may be learned through practice of the invention.

In one exemplary embodiment of the present disclosure, a reciprocating engine is provided. The reciprocating engine includes a crankshaft and a connecting rod rotatably coupled to the crankshaft. The connecting rod defines a fluid passage extending along a length thereof. The reciprocating engine also includes a piston dome coupled to the connecting rod, the piston dome defining an inlet in fluid communication with the fluid passage of the connecting rod for receiving a fluid from the fluid passage of the connecting rod, a cooling passage in fluid communication with the inlet for circulating the fluid through the piston dome, and an exit in fluid communication with the cooling passage.

In certain exemplary embodiments, the crankshaft defines a fluid passage, and wherein the fluid passage of the crankshaft is fluidly coupled to the fluid passage of the connecting rod.

For example, in certain exemplary embodiments, the reciprocating engine further includes a fluid pump coupled to and driven by the crankshaft, the fluid pump configured to provide a flow of fluid to the fluid passage in the crankshaft.

For example, in certain exemplary embodiments the connecting rod defines a first end and a second end, wherein the connecting rod is rotatably coupled to the crankshaft at the first end and coupled to the piston dome at the second end, and wherein the fluid passage of the connecting rod extends from the first end to the second end.

For example, in certain exemplary embodiments the crankshaft includes a crankpin journal, wherein the connecting rod includes an attachment end extending around the crankpin journal, wherein the crankpin journal defines at least one opening fluidly connected to the fluid passage of the crankshaft, wherein the attachment end defines an annulus in fluid communication with the fluid passage of the connecting rod and extending around the at least one opening to fluidly connect the fluid passage of the crankshaft to the fluid passage of the connecting rod.

In certain exemplary embodiments the connecting rod is a first connecting rod, wherein the piston dome is a first piston dome. With such an exemplary embodiment, the reciprocating engine may further include a second connecting rod rotatably coupled to the crankshaft, the second connecting rod defining a fluid passage extending along a length thereof; and a second piston dome coupled to the second connecting rod, the second piston dome defining an inlet in fluid communication with the fluid passage of the second connecting rod, a cooling passage, and an exit.

For example, in certain exemplary embodiments the crankshaft defines a fluid passage, and wherein the fluid passage of the crankshaft is fluidly connected to the fluid passage of the first connecting rod and the fluid passage of the second connecting rod.

For example, with certain exemplary embodiments the crankshaft defines a first fluid passage fluidly connected to the fluid passage of the first connecting rod, and wherein the crankshaft additionally defines a separate, second fluid passage fluidly connected to the fluid passage of the second connecting rod.

In certain exemplary embodiments, the reciprocating engine further includes a heat exchanger configured to receive fluid from the exit defined by the piston dome.

For example, in certain exemplary embodiments, the reciprocating engine may further include an oil pan, wherein the heat exchanger is thermally connected to the oil pan.

In certain exemplary embodiments the piston dome further defines a plurality of exits.

For example, in certain exemplary embodiments the piston dome includes a plurality of spray nozzles, and wherein the plurality of spray nozzles define the plurality of exits.

For example, in certain exemplary embodiments, the reciprocating engine further includes a cylinder including a cylindrical wall, wherein the piston dome is positioned within the cylinder, and wherein the plurality of spray nozzles of the piston dome are configured to spray fluid onto the cylindrical wall of the cylinder.

In certain exemplary embodiments the piston dome includes a hot side and a cold side, and wherein the cooling passage defined by the piston dome includes at least a portion extending proximate the hot side of the piston dome to allow the fluid therein to accept heat from the hot side of the piston dome.

In another exemplary embodiment of the present disclosure a piston assembly for a reciprocating engine is provided. The piston assembly includes a connecting rod extending between a first end and a second end, the connecting rod defining a fluid passage extending from the first end to the second end. The piston assembly additionally includes a piston dome coupled to the connecting rod at the second end of the connecting rod, the piston dome defining an inlet in fluid communication with the fluid passage of the connecting rod for receiving a fluid from the fluid passage of the connecting rod, a cooling passage in fluid communication with the inlet for circulating the fluid through the piston dome, and an exit in fluid communication with the cooling passage.

In certain exemplary embodiments the piston dome includes a hot side and a cold side, and wherein the cooling passage defined by the piston dome includes at least a portion extending proximate the hot side of the piston dome to allow the fluid therein to accept heat from the hot side of the piston dome.

In certain exemplary embodiments the connecting rod defines a first end and a second end, wherein the connecting rod is configured to be rotatably coupled to a crankshaft of the reciprocating engine at the first end and coupled to the piston dome at the second end.

For example, in certain exemplary embodiments the connecting rod includes an attachment end at the first end, and wherein the attachment end defines an annulus in fluid communication with the fluid passage of the connecting rod and configured to extend around one or more openings defined in a crankpin journal of the crankshaft to fluidly connect the fluid passage of the crankshaft to the fluid passage of the connecting rod.

In certain exemplary embodiments the piston dome further defines a plurality of exits.

For example, in certain exemplary embodiments the piston dome includes a plurality of spray nozzles, and wherein the plurality of spray nozzles define the plurality of exits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
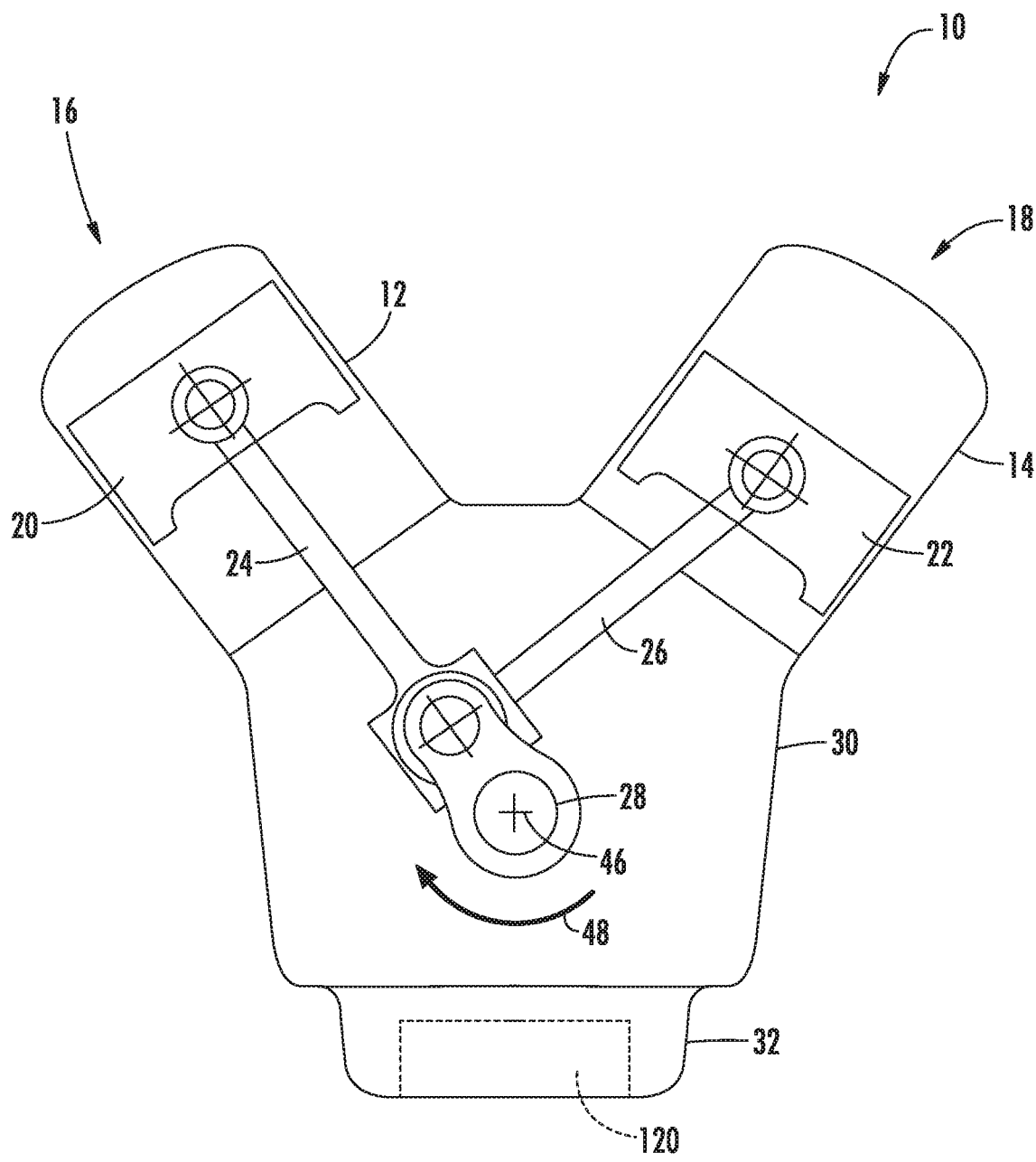
FIG. 1 is a schematic, end view of a reciprocating engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a schematic, end view of a reciprocating engine 10 in accordance with an exemplary embodiment of the present disclosure. More specifically, the reciprocating engine 10 of FIG. 1 is configured as an internal combustion engine of the reciprocating piston type having at least a first cylinder 12 and a second cylinder 14. More specifically, the exemplary reciprocating engine 10 includes a first row of cylinders 16 and a second row of cylinders 18 arranged in the form of a V-shaped design. Further, the reciprocating engine 10 includes at least a first piston dome 20 working within the first cylinder 12 and a second piston dome 22 working within the second cylinder 14. The first and second pistons domes 20, 22 are connected by way of a first connecting rod 24 and a second connecting rod 26, respectively, to a crankshaft 28. Further, the reciprocating engine 10 includes an oil pan 32 at a bottom end to collect a fluid provided during operation of the reciprocating engine 10, as will be discussed in greater detail below. Notably, in certain embodiments, the fluid may be a lubrication fluid, such as a lubricating oil. However, in other exemplary embodiments, the fluid may be any other suitable fluid capable of transferring heat between components.

Figure 2:
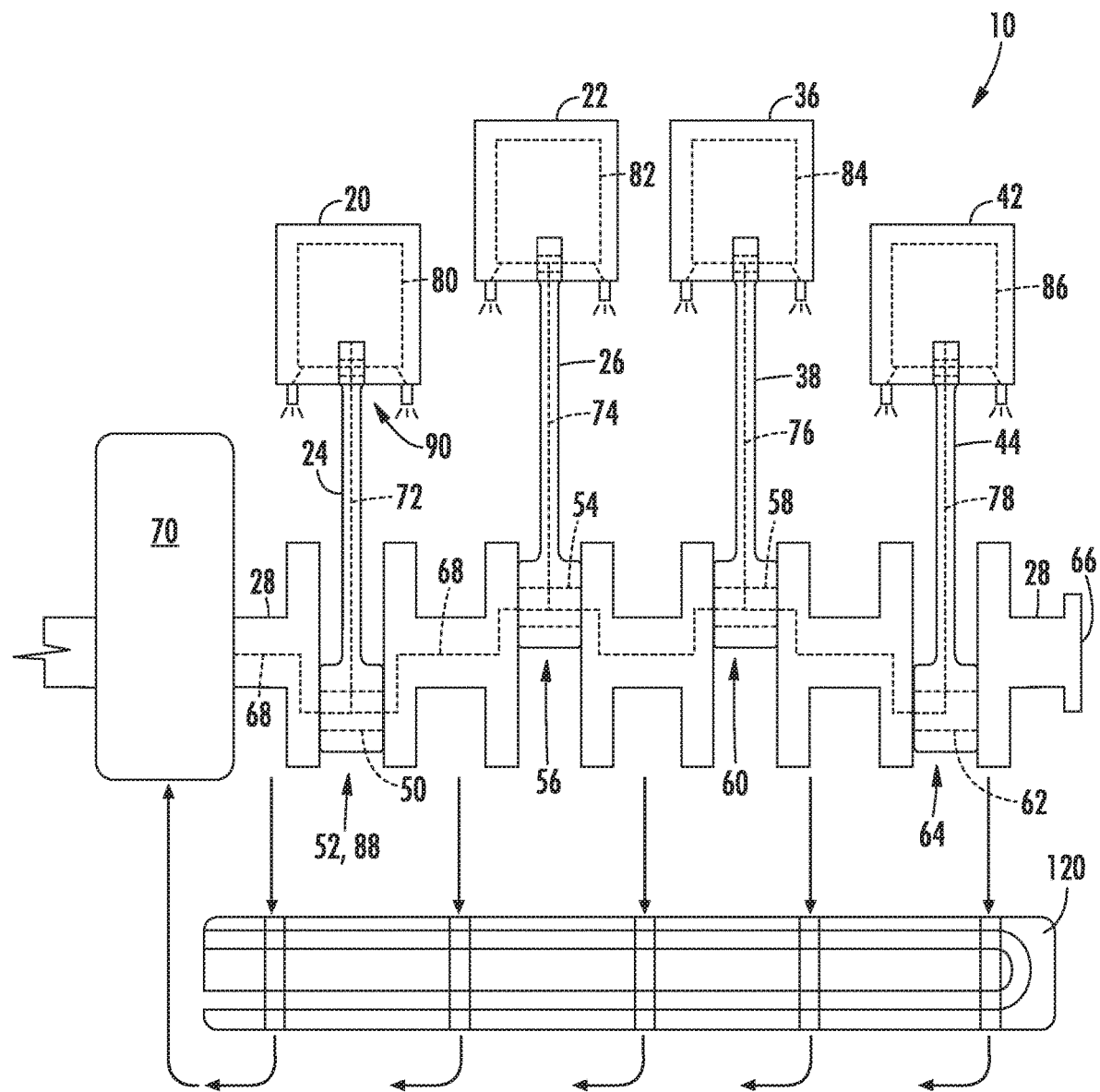
FIG. 2 is a side, schematic view of at least a section of the exemplary reciprocating engine of FIG. 1.

Referring now also to FIG. 2, a side, schematic view is provided of at least a section of the exemplary reciprocating engine 10 described above with reference to FIG. 1. As is depicted, the exemplary reciprocating engine 10 further includes a third cylinder (not depicted) and third piston dome 36 connected to crankshaft 28 through a third connecting rod 38, as well as a fourth cylinder (not depicted) and fourth piston dome 42 connected to the crankshaft 28 through a fourth connecting rod 44. It will be appreciated, however, that although the exemplary reciprocating engine 10 depicted includes four cylinders arranged in a V-shape, in other exemplary embodiments, the reciprocating engine 10 may include any other number cylinders (such as two cylinders, six cylinders, eight cylinders, etc.), arranged in any suitable manner (e.g., in-line).

During operation, the crankshaft 28 is generally rotated about a longitudinal axis 46 in a direction 48 (see FIG. 1). Further, each of the respective connecting rods 24, 26, 38, 44 includes an attachment end and are rotatably coupled to the crankshaft 28 at a location offset from the longitudinal axis 46 of the crankshaft 28 at the respective attachment ends 50.

Specifically, the crankshaft 28 includes a first crankpin journal 50 with a first attachment end 52 of the first connecting rod 24 rotatably coupled thereto; a second crankpin journal 54 with a second attachment end 56 of the second connecting rod 26 rotatably coupled thereto; a third crankpin journal 58 with a third attachment end 60 of the third connecting rod 38 rotatably coupled thereto; and a fourth crankpin journal 62 with a fourth attachment end 64 of the fourth connecting rod 44 rotatably coupled thereto. Notably, each of the crankpin journals 50, 54, 58, 62 (depicted in phantom in FIG. 2) is offset from the longitudinal axis 46 of the crankshaft 28.

Further, as previously discussed, coordinated combustion within the cylinders 12, 14, 34, 40 causes the respective pistons 20, 22, 36, 42 to move along a longitudinal direction of the respective cylinders 12, 14, 34, 40, driving rotation of the crankshaft 28 in the direction 48 (FIG. 1). The crankshaft 28 may be coupled to a component through an attachment flange 66 position at a longitudinal end of the crankshaft 28 such that the crankshaft 28 may transfer work to such component. For example, in certain exemplary embodiments, the reciprocating engine 10 may be configured for installation within a motor vehicle, such that the attachment flange 66 is coupled to, e.g., a flywheel or other component for powering motor vehicle. However, in other embodiments, the exemplary reciprocating engine 10 may be utilized in any other suitable machine or in any other suitable scenario. For example, in other exemplary embodiments, the reciprocating engine 10 may be utilized for, e.g., power generation, as a fluid pump, as a starter motor for an aircraft, etc.

As briefly noted above, the present reciprocating engine 10 includes certain features built-in for allowing fluid to more effectively provide cooling of the piston domes 20, 22, 36, 42 during operation of the reciprocating engine 10. Specifically, for the embodiment depicted, the crankshaft 28 defines a fluid passage 68 enclosed therein (denoted by dotted lines 68, see also FIG. 3, discussed below) for receiving, transferring, and providing, fluid to certain components of the reciprocating engine 10. More specifically, the exemplary reciprocating engine 10 depicted further includes a fluid pump 70 coupled to the crankshaft 28 and configured to provide a flow of fluid to the fluid passage 68 in the crankshaft 28. Notably, by coupling the fluid pump 70 to the crankshaft 28, the fluid pump 70 may provide a variable amount of fluid to the fluid passage 68 within the crankshaft 28 based on, e.g., a rotational speed of the crankshaft 28. It will be appreciated that any suitable fluid pump 70 may be provided. For example, in certain exemplary embodiments, the fluid pump 70 could be a centrifugal pump, a vane pump, a hose type drum pump, a gear pump, etc. Additionally, it will be appreciated that in other exemplary embodiments, the fluid pump 70 may instead be coupled elsewhere, and/or driven by any other suitable means (e.g., may be configured as an electric fluid pump).

Furthermore, for the embodiment depicted, each of the respective connecting rods 24, 26, 38, 44 also define a fluid passage extending along a length thereof, and similarly, for the embodiment depicted, each of the respective piston domes 20, 22, 36, 42 also define a cooling passage therein. More specifically, the first connecting rod 24 defines a fluid passage 72 extending substantially along a length thereof, the second connecting rod 26 defines a fluid passage 74 extending substantially along a length thereof, the third connecting rod 38 defines a fluid passage 76 extending substantially along the length thereof, and the fourth connecting rod 44 defines a fluid passage 78 extending substantially along a length thereof. Further, the first piston dome 20 defines a cooling passage 80 therein, the second piston dome 22 defines a cooling passage 82 therein, the third piston dome 36 defines a cooling passage 84 therein, and the fourth piston dome 42 defines a cooling passage 86 therein. The fluid passage 68 of the crankshaft 28 is, for the embodiment depicted, fluidly connected to the fluid passages 72-78 of each of the respective connecting rods 24, 26, 38, 44, and the fluid passages 72-78 of each of the respective connecting rods 24, 26, 38, 44 are fluidly connected to the cooling passages 80-86 of each of the respective piston domes 20, 22, 36, 42.

Figure 3:
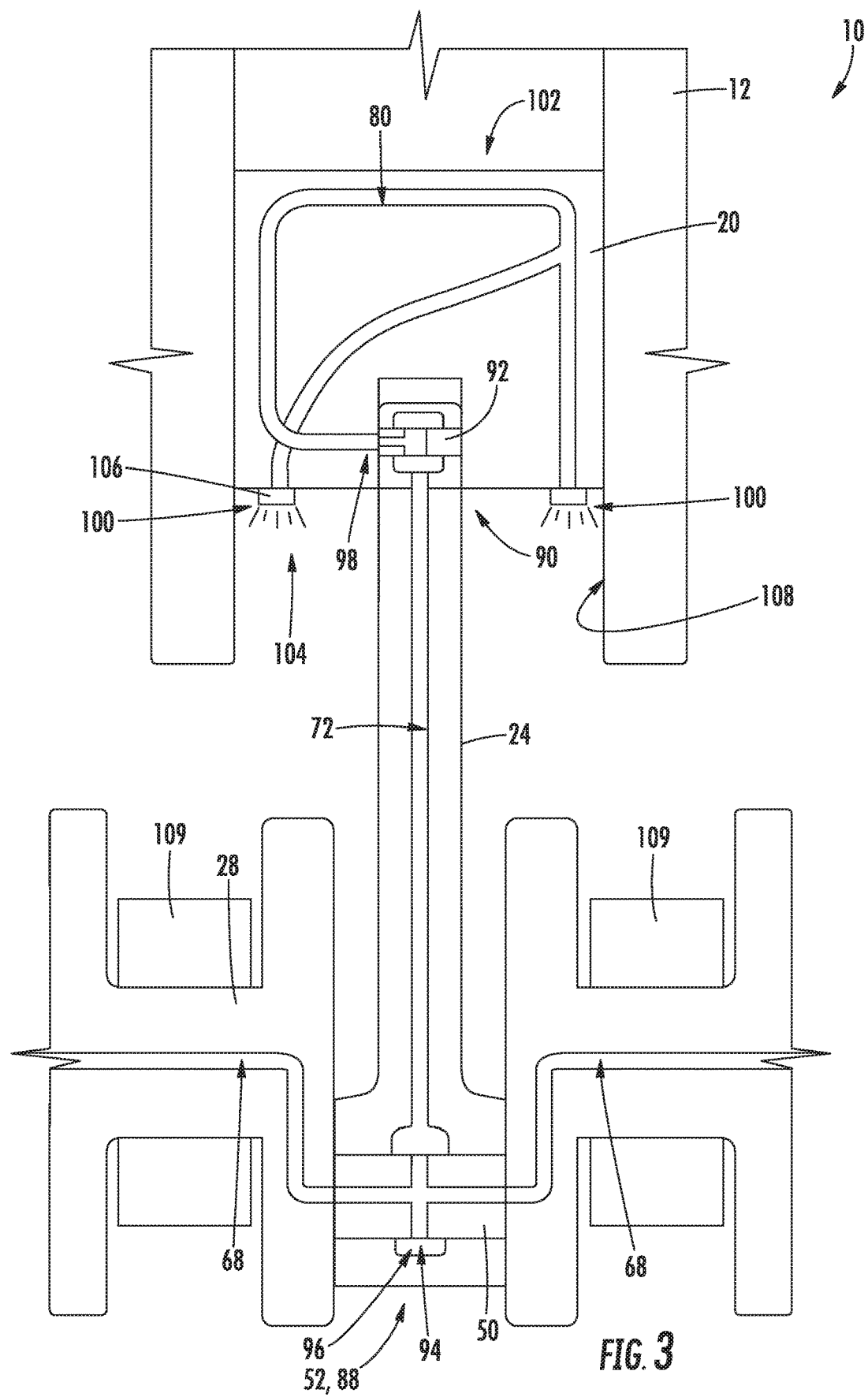
FIG. 3 is a close-up, cross-sectional view of a section of the exemplary reciprocating engine of FIG. 1.

Referring now to FIG. 3, such features and functionality will be described in greater detail. FIG. 3 provides a close-up, cross-sectional view of a section of the exemplary reciprocating engine 10 described above. More specifically, FIG. 3 provides a close-up, cross-sectional view of the first piston dome 20 (within the first cylinder 12) and first connecting rod 24 coupled to the first crankpin journal 50 of the crankshaft 28.

As stated, the crankshaft 28 defines a fluid passage 68 therein. Additionally, the first connecting rod 24 defines the fluid passage 72 extending substantially along a length thereof. More specifically, the first connecting rod 24 defines a first end 88 and a second end 90. The attachment end 52 of the first connecting rod 24 is at the first end 88, such that the first connecting rod 24 is rotatably coupled to the first crankpin journal 50 of the crankshaft 28 at the first end 88. Further, the first connecting rod 24 is coupled to the first piston dome 20 at the second end 90. More specifically, the first piston dome 20 includes a pin 92 with the second end 90 of the first connecting rod 24 rotatably coupled to the pin 92 of the first piston dome 20. The fluid passage 72 of the first connecting rod 24 extends from the first end 88 to the second end 90. Notably, in certain embodiments, one or both of the first end 88/attachment end 52 and a second end 90 may be formed of two or more components to attach the first connecting rod 24 to the first crankpin journal 50 and/or to the pin 92. Alternatively, however, one or both of the crankshaft 28 and first piston dome 20 may be assembled through the first end 88/attachment and 52 and/or the second end 90 of the first connecting rod 24.

Referring still to FIG. 3, the fluid passage 68 of the crankshaft 28 is fluidly connected to the fluid passage 72 of the first connecting rod 24. Specifically, for the embodiment depicted, the first crankpin journal 50 defines at least one opening 94, and more particularly, for the embodiment depicted defines a plurality of circumferentially spaced openings 94 fluidly connected to the fluid passage 68 of the crankshaft 28. Additionally, the attachment end 52 of the first connecting rod 24 defines an annulus 96 surrounding the first crankpin journal 50 and, more particularly, extending around the at least one opening 94, or rather around the plurality of circumferentially spaced openings 94 of the first crankpin journal 50. The annulus 96 defined at the attachment end 52 of the first connecting rod 24 therefore fluidly connects the fluid passage 68 of the crankshaft 28 to the fluid passage 72 of the first connecting rod 24.

Further, as briefly stated above, the first piston dome 20 defines the cooling passage 80. More specifically, the first piston dome 20 defines an inlet 98 in fluid communication with the fluid passage 72 of the first connecting rod 24 for receiving fluid from the fluid passage 72 of the first connecting rod 24, the cooling passage 80 in fluid communication with the inlet 98 for circulating the fluid received through the inlet 98, and an exit 100 in fluid communication with the fluid passage 72 for ejecting the fluid circulated through the cooling passage 80. As is depicted, the inlet 98 may be fluidly connected to the fluid passage 72 of the first connecting rod 24 in substantially the same manner that the fluid passage 68 of the crankshaft 28 is fluidly connected to the fluid passage 72 of the first connecting rod 24.

It will be appreciated that the first piston dome 20 generally incudes a hot side 102 and a cold side 104. The hot side is exposed to the combustion within the first cylinder 12, which drives the first piston dome 20 along a longitudinal centerline of the first cylinder 12. For the embodiment depicted, the cooling passage 80 defined by the first piston dome 20 extends through the piston dome 20 to define a fluid flow pathway from the inlet toward the hot side, along the hot side substantially perpendicular to the longitudinal centerline from a first side of the piston dome to a second side of the piston dome, and from proximate the hot side toward the cold side. The cooling passage 80 includes at least a portion extending proximate the hot side 102 of the first piston dome 20 to allow the fluid therein to accept heat from the hot side 102 of the first piston dome 20. In such a manner, the configuration of the cooling passage 80 may more effectively remove heat from the first piston dome 20 and may maintain a temperature of the first piston dome 20 within a desired operating range. Notably, as used herein, the term "proximate" with respect to the position of the cooling passage 80 refers to the cooling passage 80 being closer to the hot side 102 than the cold side 104.

Furthermore, as stated, the exit 100 defined by the first piston dome 20 is configured to eject the fluid circulated through the cooling passage 80. More specifically, for the embodiment depicted, the first piston dome 20 further defines a plurality of exits 100 fluidly coupled to the inlet 98 through the cooling passage 80. For example, as depicted in FIG. 3, the cooling passage 80 in the form of a duct enclosed by the piston dome 20 and in fluid communication with an inlet 98. The cooling passage circulates the fluid in a directional flow through the piston dome and includes at least one branch point at which the cooling passage 80 divides to connect to at least some of the plurality of exits. More specifically, still, the first piston dome 20 includes a plurality of spray nozzles 106, and the plurality of spray nozzles 106 define the plurality of exits 100. The first cylinder 12, within which the first piston dome 20 is positioned, includes a cylinder wall 108 and the plurality of spray nozzles 106 of the first piston dome 20 are configured to spray the fluid previously circulated through the first piston dome 20 onto the cylinder wall 108 of the first cylinder 12. In such a manner, the fluid may lubricate the first cylinder 12 and first piston dome 20. Notably, however, in other embodiments, the fluid may exit the first piston dome 20 in any other suitable manner. For example, in other embodiments, the fluid exit(s) 100 may not include spray nozzles 106 and instead may simply be an opening allowing the fluid to flow out of the respective piston dome and fall down to, e.g., the oil pan 32.

Accordingly, it will be appreciated, that as used herein, the term "fluid" may refer to any fluid capable of performing the functions herein. For example, in certain exemplary embodiments, the fluid may be a lubrication fluid capable of providing lubrication to the various components within the reciprocating engine 10, as well as functioning as a heat exchange fluid. Accordingly, the fluid may be any suitable lubrication oil, or other fluid known in the art, or later developed. However, in other exemplary embodiments, the fluid may instead be any other fluid capable of functioning as a heat exchange fluid.

Moreover, as is further shown in the exemplary embodiment of FIG. 3, the engine 10 further includes a plurality of crankshaft bearings 109 rotatably supporting the crankshaft 28. The bearings 109 may be any suitable type of bearings (e.g., ball bearings, roller bearings, tapered roller bearings, ceramic, stainless steel, etc.). It will further be appreciated that the fluid from the exit(s) 100 may provide lubrication to the bearings in addition to cooling the piston domes 20, 22, 36, 40.

Referring now back specifically to FIG. 2, it will be appreciated that, for the embodiment depicted, each of the second, third, and fourth connecting rods 26, 38, 44 are configured in a similar manner as the first connecting rod 24, and similarly, each of the second, third, and fourth piston domes 22, 36, 40 are configured similarly to the first piston dome 20. More specifically, for the embodiment depicted, each of the second, third, and fourth connecting rods 26, 38, 44 are rotatably coupled to the crankshaft 28 and define the fluid passages 74, 76, 78, each extending substantially along respective lengths thereof. Additionally, each of the second, third, and fourth piston domes 22, 36, 40 are coupled to the respective connecting rod 26, 38, 44 and each defines an inlet in fluid communication with the fluid passage of the respective connecting rod, a cooling passage, and an exit (not labeled).

As briefly stated above, the fluid passage 68 of the crankshaft 28 is fluidly connected to the fluid passages 72, 74, 76, 78 of each of the plurality of connecting rods 24, 26, 38, 44. Specifically, the fluid passage 68 of the crankshaft 28 is fluidly connected to the fluid passage 72 of the first connecting rod 24, the fluid passage 74 of the second connecting rod 26, the fluid passage 76 of the third connecting rod 38, and the fluid passage 78 of the fourth connecting rod 44. For example, in certain embodiments, each of the second crankpin journal 54, third crankpin journal 58, and fourth crankpin journal 62 may define one or more openings (not labeled) configured to provide the fluid to the fluid passages 74, 76, 78 in the respective second connecting rod 26, third connecting rod 38, and fourth connecting rod 44 in a manner similar to that shown in FIG. 2. Further, in order to ensure each of the plurality of piston domes 20, 22, 36, 42 receive a desired amount of fluid, such openings in the crankpin journals may be numbered and sized to meter the flow of fluid therethrough to the fluid passages 72, 74, 76, 78 in the respective connecting rods 24, 26, 38, 44.

Also, given the configuration described herein wherein the fluid may accept a substantial amount of heat from the piston domes 20, 22, 36, 42, an additional heat exchanger may be beneficial to remove additional heat from such fluid. Accordingly, for the embodiment depicted, the reciprocating engine 10 further includes a heat exchanger 120. The heat exchanger 120 is configured to receive fluid ejected from the exits (such as exit 100; FIG. 3) of the plurality of piston domes 20, 22, 36, 42. The heat exchanger 120 may be thermally connected to the oil pan 32 (as depicted in phantom in FIG. 1), such that it is dedicated to removing heat from the fluid.

It should be appreciated, however, that the exemplary embodiment depicted in FIGS. 2 and 3 is by way of example only. In other exemplary embodiments, the reciprocating engine 10 may have any other suitable configuration. For example, in other exemplary embodiments, the fluid passages in the connecting rods may be fluidly connected to the fluid passage in the crankshaft 28 in any other suitable manner, and similarly, the fluid passages in the connecting rods may be fluidly connected to the cooling passages in the respective piston domes in any other suitable manner. Further, in still other exemplary embodiments, the fluid passages in the connecting rods may be configured to receive fluid from a source other than the fluid passage in crankshaft 28. Accordingly, in certain exemplary embodiments, the fluid passages in the connecting rods may not be fluidly connected to the fluid passage in the crankshaft. Furthermore, in still other embodiments, the engine 10 may not include a heat exchanger for the fluid in the oil pan 32 (and further may not include an oil pan 32) and instead may use any other suitable thermal management system (if any at all).

Moreover, it should be appreciated that in other exemplary embodiments, the crankshaft 28 may have still other suitable configurations. For example, referring now briefly to FIG. 4, providing a side, schematic view of a section of a reciprocating engine 10 in accordance with another exemplary embodiment of the present disclosure, the fluid passage defined by the crankshaft 28 may not extend between each of the plurality of connecting rods 24, 26, 38, 44 (as is the case with the exemplary reciprocating engine 10 described above with reference to FIG. 2). More specifically, for the embodiment of FIG. 4 the fluid passage of the crankshaft 28 is not configured as a continuous fluid passage, and is not directly fluidly connected with the fluid passages 72, 74, 76, 78 of each of the connecting rods 24, 26, 38, 44. Instead, for the embodiment of FIG. 4, the crankshaft 28 defines a plurality of separate fluid passages. More specifically, for the embodiment depicted, the crankshaft 28 defines a first fluid passage 110 fluidly connected to the fluid passage 72 of the first connecting rod 24, a second fluid passage 112 fluidly connected to the fluid passage 74 of the second connecting rod 26, a third fluid passage 114 fluidly connected to the fluid passage 76 of the third connecting rod 38, and a fourth fluid passage 116 fluidly connected to the fluid passage 78 of the fourth connecting rod 44.

Figure 4:
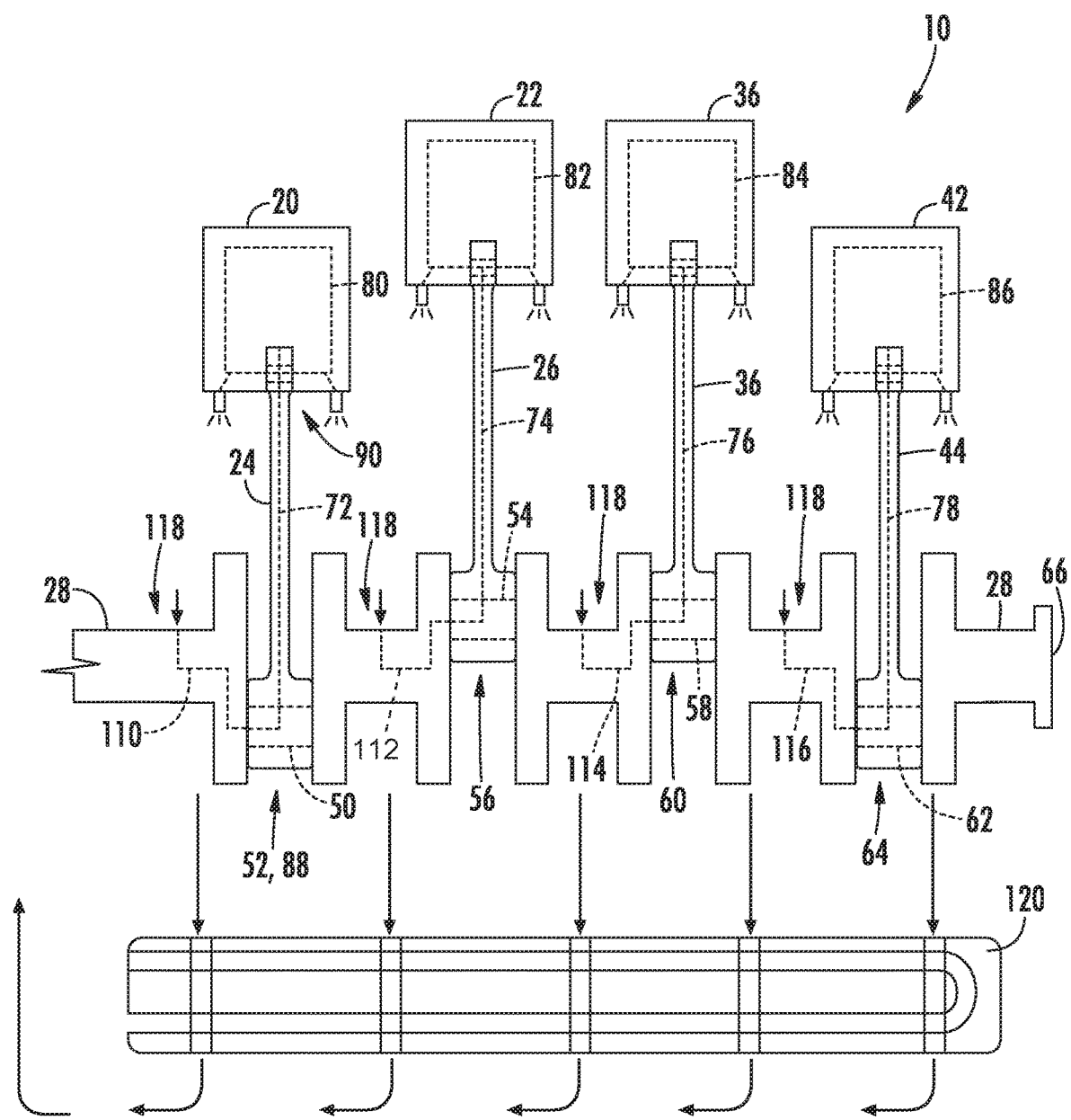
FIG. 4 is a side, schematic view of at least a section of a reciprocating engine in accordance with another exemplary embodiment of the present disclosure.

Notably, for the embodiment of FIG. 4, the reciprocating engine 10 does not include a dedicated fluid pump coupled to the crankshaft 28 (see, e.g., fluid pump 70 discussed above). Instead, the crankshaft 28 includes a plurality of openings 118 for each of the respective plurality of fluid passages 110, 112, 114, 116 to receive fluid therethrough.

It will be appreciated that in certain exemplary embodiments, one or more components of the reciprocating engine 10 described herein may be manufactured or formed using any suitable process. However, in accordance with several aspects of the present subject matter, one or more components of the reciprocating engine 10 described herein may be formed using an additive-manufacturing process, such as a 3-D printing process. For example, in certain exemplary embodiments, one or more of the crankshaft 28, connecting rods 24, 26, 38, 44, and/or piston domes 20, 22, 36, 42 may be formed using an additive manufacturing process such that they may define the respective fluid passages and cooling passages therein.

The use of such a process may allow the one or more components of the reciprocating engine 10 to be formed to include a variety of features not possible when using prior manufacturing methods (e.g., certain features of the respective fluid passages). For example, the additive manufacturing methods described herein enable the manufacture of components having unique features, configurations, thicknesses, materials, densities, fluid passageways, cooling passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing processes disclosed herein allow a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Referring to FIGS. 2 through 4, generally embodiments of the present disclosure are provided wherein fluid is provided through a fluid passage 68 in a crankshaft 28, to and through a fluid passage 72 in a connecting rod 24, to a cooling passage 80 in a piston dome 20. For the embodiments shown, the fluid is a lubrication fluid that is subsequently provided through exit(s) 100 of the piston dome 24 to a cylinder to lubricate, e.g., the cylinder walls 108. It should be appreciated, however, that in other exemplary embodiments, the fluid may not necessarily be a lubrication fluid, and instead may be any suitable heat exchange fluid. For example, instead of the "open loop" systems shown, in other exemplary embodiments, the fluid delivery system to the piston dome(s) may be a closed loop system. More specifically, in other exemplary embodiments, the fluid passage 68 may be a first, delivery fluid passage through the crankshaft 28 and the fluid passage 72 may a first, delivery fluid passage through the connecting rod 24. The connecting rod 24 may further define a second, return fluid passage (which may extend, e.g., parallel to the first fluid passage 72) and similarly the crankshaft 28 may define a second, return fluid passage (which may similarly extend, e.g., parallel to the first fluid passage 68). The second fluid passage in the crankshaft 28 may be fluidly connected to the second fluid passage in the connecting rod 24 in a similar manner that the first fluid passage 68 is connected to the first fluid passage 72 (i.e., the connecting rod 24 may define a second annulus surrounding one or more openings connected to the second passage in the crankshaft 28). Further, the second fluid passage in the crankshaft 24 may be fluidly connected to the exits 100 of the piston dome 20 in a similar manner as the first fluid passage 72 is connected to the inlet 98 of the piston dome 20. The fluid may be returned through the crankshaft 28 to, e.g., a heat exchanger, and then provided back to a fluid pump to recirculate the fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A reciprocating engine comprising:
    a cylinder comprising a cylinder wall;
    a crankshaft;
    a connecting rod rotatably coupled to the crankshaft, the connecting rod defining a connecting rod fluid passage extending along a length thereof; and
    a piston dome comprising a hot side and a cold side, the piston dome coupled to the connecting rod and positioned within the cylinder, the piston dome defining an inlet in fluid communication with the connecting rod fluid passage and configured to receive a fluid from the connecting rod fluid passage, a piston dome cooling passage in the form of a duct enclosed by the piston dome and configured to circulate the fluid in a set directional flow through the piston dome, such that the piston dome cooling passage extends through the piston dome from the inlet, toward the hot side, proximate the hot side, and from proximate the hot side toward at least one branch point at which the piston dome cooling passage divides so as to direct the fluid toward a plurality of exits defined by a plurality of nozzles disposed on the cold side of the piston dome, the plurality of nozzles configured to spray the fluid directly onto the cylinder wall.

2. The reciprocating engine of claim 1, wherein the crankshaft defines a crankshaft fluid passage, and wherein the crankshaft fluid passage is fluidly coupled to the connecting rod fluid passage.

3. The reciprocating engine of claim 2, wherein the connecting rod defines a first end and a second end, wherein the connecting rod is rotatably coupled to the crankshaft at the first end and coupled to the piston dome at the second end, and wherein the connecting rod fluid passage extends from the first end to the second end.

4. The reciprocating engine of claim 2, wherein the crankshaft includes a crankpin journal, wherein the connecting rod includes an attachment end extending around the crankpin journal, wherein the crankpin journal defines at least one opening fluidly connected to the crankshaft fluid passage, wherein the attachment end defines an annulus in fluid communication with the connecting rod fluid passage and extending around the at least one opening to fluidly connect the crankshaft fluid passage to the connecting rod fluid passage.

5. The reciprocating engine of claim 1, wherein the connecting rod is a first connecting rod defining a first connecting rod fluid passage, wherein the piston dome is a first piston dome defining a first inlet, a first piston dome cooling passage and a first plurality of exits defined by a first plurality of nozzles, and wherein the reciprocating engine further comprises:
    a second connecting rod rotatably coupled to the crankshaft, the second connecting rod defining a second connecting rod fluid passage; and
    a second piston dome coupled to the second connecting rod, the second piston dome defining a second inlet in fluid communication with the second connecting rod fluid passage, a second piston dome cooling passage, and a second plurality of exits defined by a second plurality of nozzles.

6. The reciprocating engine of claim 5, wherein the crankshaft defines a crankshaft fluid passage, and wherein the crankshaft fluid passage is fluidly connected to each of the first connecting rod fluid passage and the second connecting rod fluid passage.

7. The reciprocating engine of claim 5, wherein the crankshaft defines a first crankshaft fluid passage fluidly connected to the first connecting rod fluid passage, and wherein the crankshaft additionally defines a separate, second crankshaft fluid passage fluidly connected to the second connecting rod fluid passage.

8. The reciprocating engine of claim 1, further comprising:
    a heat exchanger configured to receive the fluid from the plurality of exits defined by the piston dome.

9. The reciprocating engine of claim 8, further comprising:
    an oil pan, wherein the heat exchanger is in thermal communication with the oil pan.

10. The reciprocating engine of claim 1, wherein the hot side of the piston dome is configured to be exposed to combustion within the cylinder, and wherein the piston dome cooling passage extending proximate the hot side of the piston dome allows the fluid therein to accept heat from the hot side of the piston dome.

11. A piston assembly for a reciprocating engine including a crankshaft and a cylinder having a cylinder wall, the piston assembly comprising:

a connecting rod extending between a first end and a second end, the connecting rod defining a connecting rod fluid passage extending from the first end to the second end; and a piston dome comprising a hot side and a cold side, the piston dome defining an inlet in fluid communication with the connecting rod fluid passage for receiving a fluid from the connecting rod fluid passage, a piston dome cooling passage in the form of a duct enclosed by the piston dome and configured to circulate the fluid in a set directional flow through the piston dome, such that the piston dome cooling passage extends through the piston dome from the inlet, toward the hot side, along the hot side, and from along the hot side toward at least one branch point at which the piston dome cooling passage divides so as to direct the fluid toward a plurality of exits disposed on the cold side of the piston dome, the plurality of exits configured to spray the fluid directly onto the cylinder wall.

12. The piston assembly of claim 11, wherein the hot side of the piston dome is configured to be exposed to combustion within the cylinder, and wherein the piston dome cooling passage extending along the hot side of the piston dome allows the fluid therein to accept heat from the hot side of the piston dome.

13. The piston assembly of claim 11, wherein the connecting rod is configured to be rotatably coupled to the crankshaft at the first end and coupled to the piston dome at the second end.

14. The piston assembly of claim 13, wherein the connecting rod includes an attachment end at the first end, and wherein the attachment end defines an annulus in fluid communication with the connecting rod fluid passage and configured to extend around one or more openings defined in a crankpin journal of the crankshaft to fluidly connect a crankshaft fluid passage to the connecting rod fluid passage.

15. The piston assembly of claim 11, wherein the plurality of exits disposed on the cold side of the piston dome are defined by a plurality of spray nozzles.

* * * * *